US012791873B2

(12) United States Patent
Lindberg et al.

(10) Patent No.: US 12,791,873 B2
(45) Date of Patent: Nov. 10, 2026

(54) SPECTACLE ROD WITH FRICTION ELEMENT AT EAR BEND

(71) Applicant: LINDBERG A/S, Åbyhøj (DK)

(72) Inventors: Henrik Lindberg, Risskov (DK); Lars Bøjvad, Højbjerg (DK); Hans Boye-Nielsen, Hinnerup (DK); Thomas Mach, Skødstrup (DK); Christina Bak Andersen, Randers (DK)

(73) Assignee: LINDBERG A/S, Åbyhøj (DK)

( * ) Notice: Subject to any disclaimer, the term of this patent is extended or adjusted under 35 U.S.C. 154(b) by 384 days.

(21) Appl. No.: 18/289,042

(22) PCT Filed: May 3, 2022

(86) PCT No.: PCT/DK2022/050090
§ 371 (c)(1),
(2) Date: Oct. 31, 2023

(87) PCT Pub. No.: WO2022/233378
PCT Pub. Date: Nov. 10, 2022

(65) Prior Publication Data

US 2024/0201516 A1 Jun. 20, 2024

(30) Foreign Application Priority Data

May 3, 2021 (DK) ........................... PA 2021 70202

(51) Int. Cl.
*G02C 5/16* (2006.01)
*G02C 5/14* (2006.01)

(52) U.S. Cl.
CPC ............... *G02C 5/16* (2013.01); *G02C 5/143* (2013.01)

(58) Field of Classification Search
CPC ...... G02C 5/16; G02C 5/143; G02C 2200/16; G02C 2200/20; G02C 5/18
See application file for complete search history.

(56) References Cited

U.S. PATENT DOCUMENTS 3,402,005 A 9/1968 Liautaud et al.
4,563,066 A 1/1986 Bononi
(Continued)

FOREIGN PATENT DOCUMENTS

CN 1208472 A 2/1999
CN 1253633 A 5/2000
(Continued)

OTHER PUBLICATIONS

International Search Report for PCT/DK2022/050090 mailed on Jul. 11, 2022.
(Continued)

*Primary Examiner* — Sharrief I Broome
*Assistant Examiner* — K Muhammad
(74) *Attorney, Agent, or Firm* — Schmeiser Olsen PLLC

(57) ABSTRACT

A spectacle rod is provided, including a plate-shaped metal rod and a friction element located at an ear bend. In order to avoid inadvertent removal of the friction element from the metal rod, a protrusion and the recess are formed. The protrusion and recess include a first transverse protrusion at the outermost second end of the spectacle rod. This transverse protrusion, together with the spectacle rod, forms an outwardly open recess. This recess has a smaller cross-section at the opening than at a central part. Thereby, elastic compliant material from the friction element will be received in the recess. The elastic material will be compressed so that a clamping effect occurs, contributing to a retention which prevents accidental separation of the friction element and the metal rod.

11 Claims, 3 Drawing Sheets

(56) References Cited

U.S. PATENT DOCUMENTS

| | | | | |
|---|---|---|---|---|
| 5,002,381 | A | 3/1991 | Murrell | |
| 5,137,342 | A | 8/1992 | Jannard et al. | |
| 5,610,669 | A | 3/1997 | Kuipers et al. | |
| 6,045,221 | A | 4/2000 | Resendez, Sr. | |
| 7,165,838 | B1 | 1/2007 | Sapp | |
| 2011/0170052 | A1 | 7/2011 | Lee et al. | |
| 2015/0116654 | A1 | 4/2015 | Tang | |
| 2015/0160473 | A1 * | 6/2015 | Tormen .................... | G02C 5/16 351/116 |

FOREIGN PATENT DOCUMENTS

| | | | | | |
|---|---|---|---|---|---|
| CN | 203037941 | U | | 7/2013 | |
| CN | 205 656 381 | U | | 10/2016 | |
| CN | 206863374 | U | | 1/2018 | |
| CN | 207352297 | U | | 5/2018 | |
| CN | 212540929 | U | | 2/2021 | |
| DK | 178971 | B1 | | 7/2017 | |
| EP | 2728399 | A1 | | 5/2014 | |
| JP | H10 142559 | A | | 5/1998 | |
| JP | 2006 317473 | A | | 11/2006 | |
| JP | 2017-21379 | A | | 1/2017 | |
| JP | 2019 510278 | A | | 4/2019 | |
| KR | 20010063177 | A | * | 7/2001 | |
| KR | 20200001172 | U | | 6/2020 | |
| WO | 2007/081745 | A2 | | 7/2007 | |
| WO | 2013/002379 | A1 | | 1/2013 | |
| WO | 2017/167342 | A1 | | 10/2017 | |
| WO | WO-2020244918 | A1 | * | 12/2020 | ........... G02C 5/2254 |

OTHER PUBLICATIONS

Danish Search Report for Application No. PA 2021 70202 completed on Oct. 29, 2021.

Written Opinion for PCT/DK2022/050090 mailed on Jul. 11, 2022.

* cited by examiner

SPECTACLE ROD WITH FRICTION ELEMENT AT EAR BEND

CROSS-REFERENCE TO RELATED APPLICATIONS

This application claims priority to PCT Application No. PCT/DK2022/050090, having a filing date of May 3, 2022, which is based DK Application No. PA 2021 70202, having a filing date of May 3, 2021, the entire contents both of which are hereby incorporated by reference.

FIELD OF TECHNOLOGY

The following relates to a spectacle rod with a first end part intended for connection with a front piece, as well as a second end part intended to be bent to form an ear bend, the spectacle rod having a longitudinal direction and a transverse direction, and the spectacle rod being formed, at least above the second end part of the spectacle rod, by a plate-shaped rod having side faces as well as bottom and top faces, and wherein a friction element made from an elastic, compliant material is connected to the plate-shaped rod in a position at the ear bend for contact behind the ear of a user, and wherein the plate-shaped rod has a first transverse protrusion, which first transverse protrusion is directed in the transverse direction and obliquely in the longitudinal direction in order to form, together with the second end part of the metal rod, a longitudinally open recess, and wherein, in the first end part of the friction element, a first transverse hole is provided for receiving the first transverse protrusion of the plate-shaped rod, and wherein the plate-shaped rod is a metal rod, and wherein the friction element is conduit-shaped so that the conduit walls and bottom cover the side faces and the bottom face of the metal rod, and wherein the first transverse hole of the friction element is formed in the material quantity and directed in the transverse direction in order to receive the first transverse protrusion of the metal rod, and wherein elastic material at the first end part of the friction element is received in the open recess of the metal rod, so that the first transverse protrusion and the recess form first retaining means, and wherein between the walls and the bottom of the conduit and the side faces of the metal rod, further retaining means are provided which prevent the displacement of the friction element in the longitudinal direction and transverse direction of the metal rod.

Bottom and top faces refer to the orientation of the spectacle rod during use, and the side faces will connect the top and bottom faces.

BACKGROUND

Spectacle rods are used for a spectacle frame comprising a front piece and two spectacle rods connected to the front piece, via respective hinges, wherein the spectacle rods are pivotally connected to the front piece.

It has been known for many years to manufacture spectacle rods from plastic in the form of acetate.

Likewise, it has been known for many years to manufacture spectacle rods from metal, including titanium.

However, embodiments of the invention also apply to spectacle rods made from other types of material, although it will be explained in the following specifically in connection with titanium.

It has been known to provide the spectacle rods with the friction element, which should be replaceable by the user. This friction element is often a tube pulled over a metal rod in a position at the ear bend for contact behind the ear of a user. This is typically used on metal spectacle rods in consideration of the comfort of the user, but is also used on plastic spectacle rods. This avoids direct contact between plastic and sweat, grease and other excretions that are degrading to the plastic. However, these tubes may give rise to impaired comfort, since the edges of the tube may feel uncomfortable to the user. Furthermore, there is a risk of the tube being displaced along the metal rod so that it does not retain an optimal location at the ear bend.

It is proposed, for example, in U.S. Pat. No. 6,045,221, to place a friction element in a recessed manner in a recess in the side of the first end of the metal rod, which is intended for connection with a front piece. Plastics and especially acetate are very sensitive to notch effects, which means that heavy dimensional transitions cannot be made in the spectacle rod, which is especially true for the ear bend. This results in limitations when designing the plastic rod and the bracing element. The US specification thus also shows a friction element in the form of a tube for use in the ear bend.

Acetate is a soft plastic material and is therefore suitable for bending in a plane for the formation of an ear bend, adapted for placement behind the ear of a user, and for bending in a second plane for adaptation according to the shape of the heads of the users. Due to the softness of acetate, the spectacle rods have previously had a considerable size, which has made bending difficult and made a pair of spectacles undesirably heavy and full behind the ear.

It is a desire to minimize the size of the spectacle rod for the sake of the comfort of the user, both in terms of weight and fullness. However, thereby strength and shape stability become insufficient.

Furthermore, from U.S. Pat. No. 4,563,066 is known a spectacle rod formed by a metal rod. At its end at the ear bend, the metal rod is covered by a plastic sheath, which is fixed on the metal rod. In this area, the metal rod is provided with serrated protrusions to ensure, together with a gluing, the retention of the plastic sheath on the metal rod. The plastic sheath is enclosed in a teardrop-shaped terminus of a silicone sheath attached to the metal rod by the ear bend. There is no possibility of replacing the combined plastic-silicone sheath.

Furthermore, from KR20200001172 U is known a spectacle rod of the type initially mentioned. It describes a spectacle rod, which at its end has a U-bent end part, wherein the first transverse protrusion is placed on the outermost folded part. Thereby, the U-bent part will contribute to pressing the first transverse protrusion into the first transverse hole. The friction element is formed by a sheath, wherein the first transverse hole is formed in the bore of the sheath, enveloping the entire U-bent end part of the metal rod.

Furthermore, WO 2017/167342 A1 discloses a spectacle rod of the type mentioned in the first paragraph of the description and as defined in the preamble of claim 1. However, this document does not disclose a spectacle rod which enables secure retention of a friction element on a metal rod in a simple manner and ensures a covering of the outer end of the metal rod by the friction element.

SUMMARY

An aspect relates to a spectacle rod, which solves the problems of the known spectacle rods and which enables secure retention of a friction element on a metal rod in a simple manner, so that the outer end of the metal rod is covered by the friction element, which makes it possible for the user to easily and simply replace the friction element themselves.

In an additional aspect, the aspect is to provide a metal spectacle rod, wherein the metal rod has a rectangular cross-section, and wherein the friction element encloses a small side face and two large side faces of the metal rod in a largely U-shaped conduit in the friction element.

According to embodiments of the present invention, this is achieved by a spectacle rod which is distinctive in that the first transverse protrusion of the plate-shaped rod is provided at its outermost second end, in that the longitudinally open recess is form, together with the outermost second end part of the metal rod, which longitudinally open recess has at its opening a smaller cross-section than at a central part of the recess, in that the friction element at a first end of the conduit is closed by a material quantity at the first end of the friction element, in that the first transverse hole of the friction element is also directed obliquely in the longitudinal direction, in that elastic material at the first end part of the friction element is received in the open recess of the metal rod in an elastically compressed state.

When the friction element is mounted on the metal rod, the first transverse protrusion of the metal rod will be pressed into the first transverse hole of the friction element, at the same time as an elastic material is pressed into the longitudinally open recess. Due to the elastic compliance of the friction element material, a press fit will have been established. This achieves secure retention of the friction element on the metal rod.

Since the open recess at its opening has a smaller cross-section than at a central part of the recess, the elastic material will be compressed, thus ensuring that the friction element cannot be inadvertently displaced longitudinally relative to the metal rod.

The oblique orientation of the first transverse protrusion of the spectacle rod ensures that the first end part of the friction element cannot be inadvertently displaced in the transverse direction relative to the metal rod.

Thus, the protrusion and the recess may be referred to as first retaining means that ensure the retention of the friction element on the metal rod, at least at the outermost end of the metal rod.

To ensure that the entire length of the friction element cannot be inadvertently displaced in the transverse direction relative to the metal rod, additional retaining means are provided to prevent this. Such means may be mechanical engagement, gluing or similar mutual retention. If gluing is used, it must be gluing of a type that can be easily broken so that a user may replace the friction element.

The first hole in the friction element may be manufactured with a size smaller than that of the first transverse protrusion of the metal rod, so that the first transverse protrusion of the metal rod is received therein with a clamping effect due to the elastic compliance of the material. This provides additional safety against accidental displacement of the friction element relative to the metal rod.

When using a conduit-shaped friction element instead of the known bushing/sheath, it will furthermore be possible that the upper edge area of the metal rod is visible at the upper open edge of the friction element conduit. It will also be possible that a narrow edge area of the metal rod is located above the friction element and is thus visible to a user. This is a desirable design element of spectacles.

The edge area protruding above the friction element conduit will have such a small extent above the friction element that there is no risk of it coming into contact with the user.

A further aspect that must be observed is that the friction element is a 'service element' which, over time, must be replaced. It is therefore important that this element can be easily and quickly replaced by the user. By having the metal rod extend a small distance above the upper side of the friction element, it will be easier for the user to get a grip at the upper side of the friction element and pull or press this in the transverse direction to release the friction element from the metal rod.

If the friction element were to extend to a position off or above the upper side of the metal rod, it would be more difficult to make the transverse displacement, since the fingers of the user cannot establish an unambiguous grip for transverse displacement of the silicone element, because there is a risk that the fingers will also press against the upper side of the metal rod.

The word 'accidental', as used in this description, means that during the normal use of spectacles, there can be no displacement of the friction element in the longitudinal direction or transverse direction relative to the metal rod. However, when applying a manual force, which can be exerted by a user, an intentional displacement of the friction element in the longitudinal direction or transverse direction relative to the metal rod may be made to allow the replacement of the friction element.

In principle, a spectacle rod includes a rod element and a friction element. In the present application, explanations have been given in which the rod element is referred to as a metal rod.

In the present application, plate-shape means a metal rod with a rectangular cross-sectional shape with a first side that is significantly smaller than the second side. For example, the ratio may be from 1:4-1:10 or even greater. The first side may thus be referred to as the thickness of the plate, and the second side may be referred to as the height of the metal rod. It is generally desired for a spectacle rod to have as small a thickness as possible in the area at the ear of the user.

The metal rod will thus, in the second end part, have two large side faces as well as two small side faces, forming the bottom and top faces. The cross-section may be the same or different over the length of the metal rod. Thus, it is possible for the metal rod to have a second and greater thickness in the first end part as well as in an intermediate part connecting the first and second end parts. Likewise, in the first end part and the intermediate part, the metal rod may have other cross-sectional shapes than rectangular ones.

A metal rod provides a shape stability for the spectacle rod. This shape stability will not only be provided in the plane of the ear bend, but will also be able to establish a shape stability when the metal rod is bent in the direction perpendicular to the ear bend to establish an adaptation to the head shape of the user.

According to an embodiment, the spectacle rod of the invention is distinctive in that the metal rod at its bottom face is provided with transverse second protrusions for releasable snap engagement with second holes in the bottom of the conduit, wherein the second protrusions at their connection to the metal rod have a smaller cross-section than that of the second protrusions at a distance from the metal rod, so that the second protrusions are retained in the second holes at the bottom of the conduit due to the elastic compliance of the friction element material.

In order to obtain a particularly simple snap effect, it is desired that the friction element is made of an elastically compliant material. In this way, the user will be able to establish the snap effect in a particularly simple way. At the same time, the elastic compliance of the friction element material will help to ensure the safe retention of the friction element. Likewise, the elastic compliance will make it easy for the user to establish the snap engagement compared to friction elements in which a hard material is provided.

According to a further embodiment, the spectacle rod of the invention is distinctive in that a transverse protrusion, a hook-shaped protrusion, is formed at the opening of the recess on the first transverse protrusion and/or on the outermost second end part of the metal rod.

In the present patent application, 'hook-shape' means a protrusion that does not necessarily have an extent in which an outer end extends over an arc of 180° or more. The protrusion need only have an extension in the transverse direction relative to the protrusion or the outermost second end part of the metal rod. A hook-shaped protrusion may thus have a shape that extends over an arc of 90° or less. It is desirable that the transverse protrusion has a curvature with an arc of 90° or less.

The protrusion may have an arcuate shape. Alternatively, it may be angular and formed by rectilinear edges of the protrusion or a combination of curved and rectilinear edges of the protrusion.

By having a hook-shaped protrusion formed at the opening of the recess, a particularly safe retention of the material of the friction element in the recess in the metal rod is achieved.

The hook-shape ensures that it takes a greater force to lead the friction element material out of the recess, which reduces the risk of an accidental separation.

It is desirable that the hook-shaped protrusion is located on the first transverse protrusion. Alternatively, it may be provided on the outermost second end part of the metal rod. In both situations, the opening will not only have a smaller cross-section, but will additionally be equipped with a hook-shape, which provides safe retention of the elastic material inside the recess.

According to a further embodiment, the spectacle rod of the invention is distinctive in that the first hole in the friction element is manufactured with a size smaller than that of the first protrusion of the metal rod, so that the first protrusion of the metal rod is received therein with a clamping effect.

This ensures greater safety against accidental separation, since the first protrusion of the metal rod must be pressed into the first hole, thereby compressing the elastic material of the friction element. The friction element will thereby establish a clamping effect on the first protrusion of the metal rod.

The first hole in the friction element may be manufactured with a size smaller than that of the first transverse protrusion of the metal rod, so that the first transverse protrusion of the metal rod is received therein with a clamping effect due to the elastic compliance of the material. This provides additional safety against accidental displacement of the friction element relative to the metal rod.

According to a further embodiment, the spectacle rod of the invention is distinctive in that the conduit is formed with a smaller width than the thickness of the metal rod, so that the conduit side walls are in elastic abutment with the side faces of the metal rod.

It is possible to establish a clamping effect against the side faces of the metal rod due to the elastic compliance of the conduit side walls. However, the side walls will be thin to ensure as little material as possible in the ear bend. However, the conduit side walls will be in elastic abutment with the side faces of the metal rod when the conduit is manufactured with a smaller width than the thickness of the metal rod. This establishes a retention while avoiding the risk of impurities accumulating in a gap between the metal rod and the conduit side walls.

Alternatively, the conduit may be formed with the same width as the thickness of the metal rod, so that the conduit side walls are in abutment with the side faces of the metal rod without concurrent elastic clamping effect, but this is nevertheless a mounting without a risk of impurities accumulating in a gap between the metal rod and the conduit side walls. This may be used, for example, in conjunction with a glue joint that holds the conduit side walls against the metal rod.

According to a further embodiment, the spectacle rod of the invention is distinctive in that, in an intermediate part at the side facing the second protrusions of the metal rod, the metal rod has an abutment face for an end face of the friction element.

As the metal rod is manufactured with an abutment face on which the end face of the friction element may be in abutment, the risk of a displacement in the longitudinal direction of the metal rod is avoided. The abutment face of the metal rod may be provided by the metal rod having a recess in its bottom. The transverse second protrusions of the metal rod will thus be provided at the bottom of this recess. Thereby, an end wall of the recess might serve as the abutment face for an end face of the friction element.

According to a further embodiment, the spectacle rod of the invention is distinctive in that the friction element covers at least part of the outermost end face of the second end part of the metal rod.

In order to avoid contact between the user and the metal rod, the friction element will be manufactured so that one end of the conduit is closed. This outermost end part of the friction element, which closes the conduit, will at the same time be able to cover the outermost end face of the second end part of the metal rod. This reduces the risk of contact between the user and the metal rod. Furthermore, the friction element material at this end part will provide a material quantity that reduces the risk of the first transverse protrusion of the metal rod penetrating the friction element material thus exposing part of the metal rod.

According to a further embodiment, the spectacle rod of the invention is distinctive in that the metal rod is made of titanium.

Titanium is desired for the manufacture of the metal rod, as this is a very light material. However, other metals may also be used for the manufacture of the metal rod.

According to a further embodiment, the spectacle rod of the invention is distinctive in that the side walls of the friction element conduit have decreasing thickness towards the side faces of the metal rod to form a smooth transition.

Since there is a smooth transition, the risk of the metal rod having an annoying effect on the user is avoided. The smooth transition between the side faces of the metal rod and the friction element will contribute to user comfort.

According to a further embodiment, the spectacle rod of the invention is distinctive in that the friction element is manufactured from elastic polymer.

Although various elastic materials may be used, it is desirable to use elastic polymer, since this has good properties for moulding with a certainty of forming the holes in the correct shape. This ensures retention without the risk of accidental release of the friction element from the metal rod.

According to a further embodiment, the spectacle rod of the invention is distinctive in that the rectangular metal rod is provided with a recess at the bottom face and that the transverse second protrusions are located at the bottom of this recess. It is then desirable for the friction element to have a length equal to that of the recess, so that at the end of the recess there is an abutment face for the end face of the friction element. This increases the certainty that the friction element cannot be displaced in the longitudinal direction relative to the metal rod.

At the same time, the extent of the spectacle rod with the friction element in the ear bend will be small, since only a small part of the friction element will extend outside the cross-section defined by the metal rod. Thus, it can be said that the friction element is located partially recessed into the metal rod, and the outer perimeter of the friction element and metal rod approaches the outer perimeter of the metal rod. This increases comfort for the user.

The metal rod may form an integral part of a hinge element used to attach the spectacle rod to a front piece. This may be done by appropriately bending the first end part of the metal rod, so that a hinge part is formed.

BRIEF DESCRIPTION

Some of the embodiments will be described in detail, with references to the following Figures, wherein like designations denote like members, wherein.

DETAILED DESCRIPTION

Figure 1:
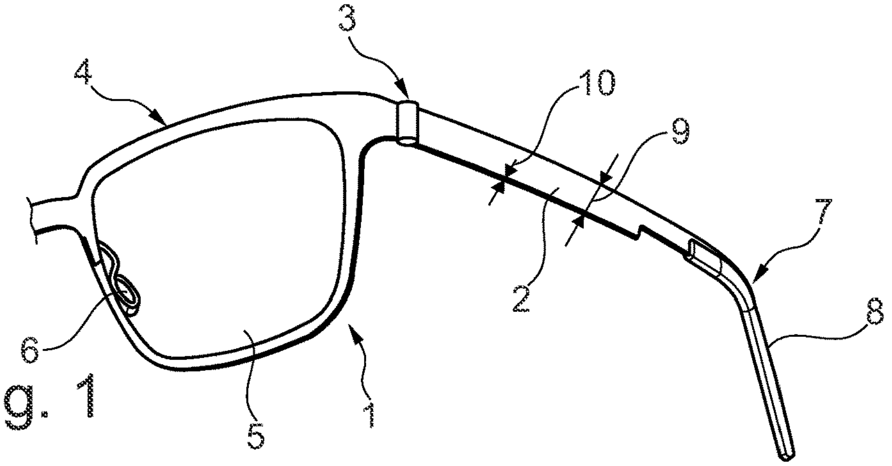
FIG. 1 shows a partial perspective view of a pair of spectacles with a spectacle rod according to embodiments of the invention.

FIG. 1 shows a partial view of a pair of spectacles 1. The spectacles include a spectacle rod in the form of a metal rod 2, which is connected via a hinge 3 to a front piece 4. In the front piece 4, a spectacle lens 5 is provided in a frame. The front piece 4 further comprises a nose pad 6 for abutment with the nose of the user.

The metal rod 2 has an ear bend 7. At the ear bend 7, a friction element 8 is mounted in a position where there will be contact behind the ear of a user. The friction element 8 is manufactured from an elastic, compliant material, such as an elastic polymer.

As can be seen, the metal rod 2 is plate-shaped, having a significantly greater height 9 than thickness 10.

Figure 2:
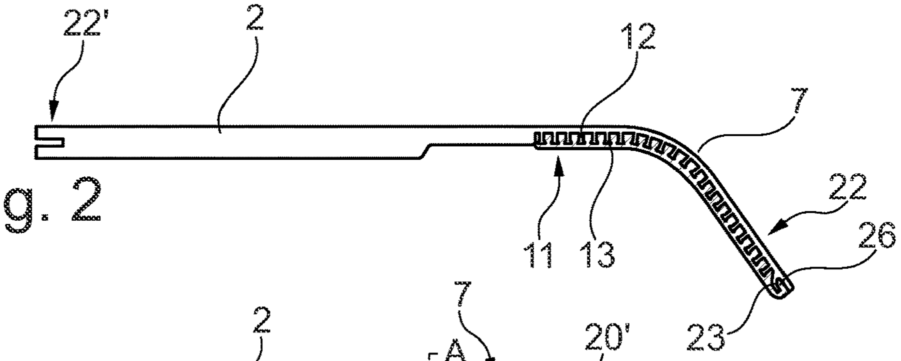
FIG. 2 shows a side view, partly in section, of the spectacle rod of FIG. 1.

FIG. 2 shows the metal rod 2 with the friction element 8 shown in section. In the bottom face of the metal rod, a recess 11 is provided, in which the friction element is partially received. In the recess 11, the metal rod is provided with a number of transverse second protrusions 12. These second protrusions 12 are mushroom-shaped or arrow-shaped, so that they have a smaller cross-section at their connection to the metal rod 2 than their cross-section at a distance from the metal rod. The protrusions 12 are mounted with a snap effect in transverse second holes 13 in the friction element 8 and will be retained therein by a clamping force exerted due to the elastic compliance of the friction element material.

It can be said that a snap effect is thereby achieved, since the protrusions 12 are pressed into the holes 13.

Figure 3:
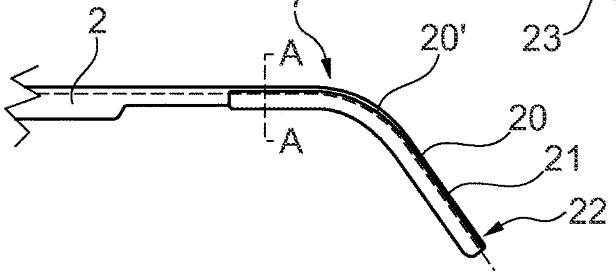
FIG. 3 shows a partial side view of the spectacle rod of FIG. 1.
Figure 4:
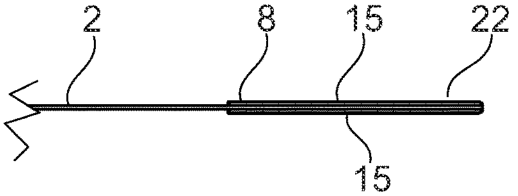
FIG. 4 shows a top view of the spectacle rod of FIG. 3.

As is particularly clear from FIGS. 3 to 5, the friction element has a conduit shape with a conduit 14 for receiving the metal rod 2. The conduit includes two side walls 15 and a bottom 15'. The side walls have surfaces 16, which are in abutment with side faces 17 of the metal rod 2. Likewise, the bottom 15' will have a bottom face 18, which is in contact with a bottom face 19 of the metal rod 2. The metal rod 2 has a top face 20 that extends over the friction element 8.

Figure 5A:
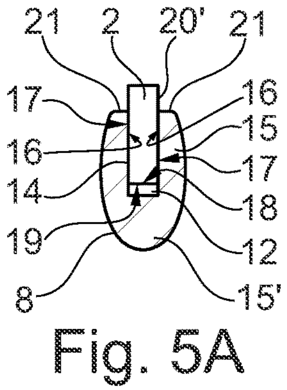
FIG. 5A shows an enlarged cross-section according to the arrows A-A of FIG. 3.
Figure 5B:
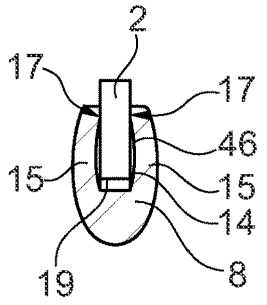
FIG. 5B shows a cross-section similar to FIG. 5A of a second embodiment.

FIGS. 5A and 5B show an enlarged cross-section through the spectacle rod between the transverse projections 12 on the metal rod 2.

FIG. 5A and FIG. 5B further show that the sidewalls 15 have a decreasing thickness upwards in the direction of the side faces 17 of the metal rod 2. This provides a smooth transition between the outside of the friction element and the metal rod 2. However, there is an upper side 21 on the side walls 15, which the user may use as a pressure surface when the friction element 8 is to be separated from the metal rod 2.

FIG. 5A shows an embodiment in which the conduit 14 is formed with smaller width than the thickness of the metal rod 2, so that the conduit side walls 15 are in elastic abutment with the side faces 17 of the metal rod.

FIG. 5B shows an embodiment in which the conduit 14 is formed with the same width as the thickness of the metal rod 2, so that the conduit side walls 15 are in abutment with the side faces 17 of the metal rod, without any elastic clamping effect. Between the side walls 15 and the side faces 17, a glue joint 46 is provided to ensure the retention of the friction element against the side faces 17 of the metal rod.

FIG. 3 shows an enlarged side view in the area of the ear bend 7. FIG. 3 shows a section line A-A for the position in which the sectional view of FIG. 5 is made. It can be seen from FIG. 3 that a narrow marginal edge area 20' (see also FIG. 5) on the metal rod 2 is above the upper side 21. Thus, a user will be able to easily grab hold at the upper side 21 and pull the friction element in the transverse direction to free it from the engagement with the protrusions 12 when the friction element is to be replaced.

FIG. 2 shows the metal rod 2, which has a first end 22' for attachment to the front piece, and a second end 22 farthest away from the front piece 4. At the outermost second end 22, the metal rod has a transverse first protrusion 23.

Figure 6:
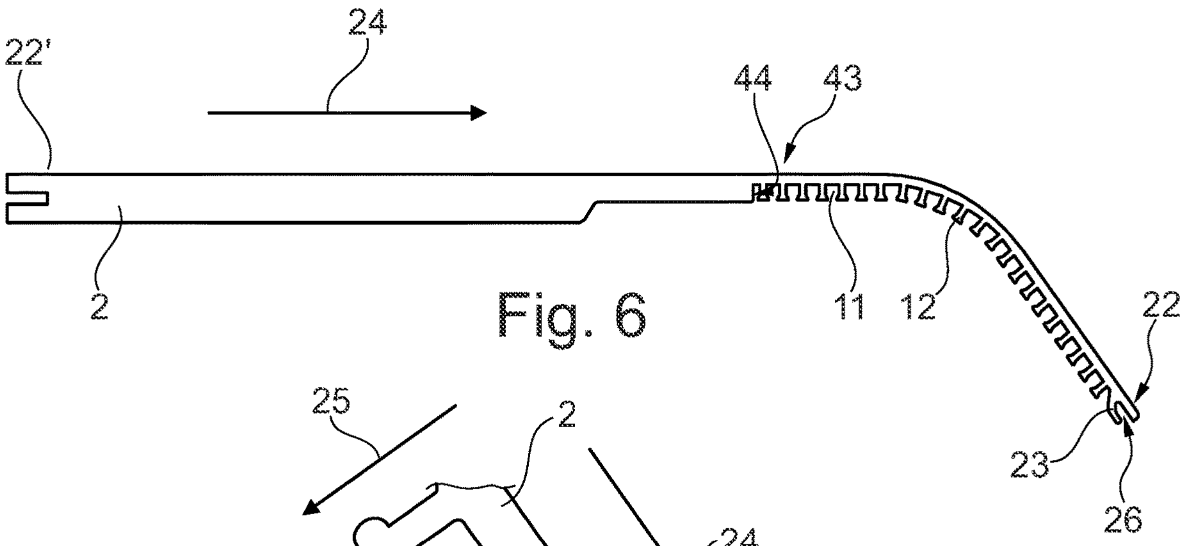
FIG. 6 shows a side view of the metal rod of FIG. 1 without a friction element attached.
Figure 7:
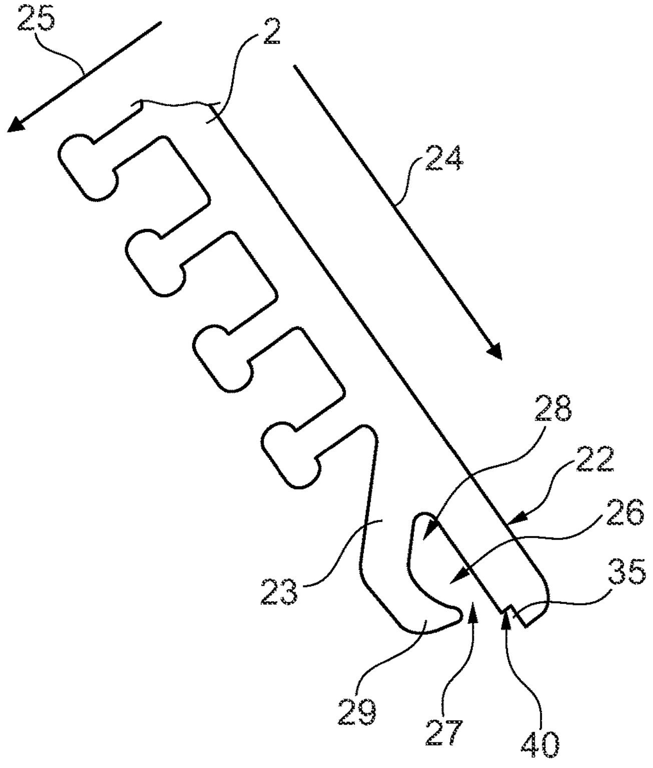
FIG. 7 shows a partial, enlarged image of the metal rod of FIG. 6.

FIGS. 6 and 7 show more clearly the design of the first projection 23 and the second projections 12 on the metal rod 2.

The metal rod 2 has a longitudinal direction 24 and a transverse direction 25, as indicated in FIGS. 6 and 7. The longitudinal direction 24 and the transverse direction 25 of the metal rod correspond to the longitudinal direction and transverse direction of the spectacle rod.

The first protrusion 23 extends in the transverse direction 25 and with an oblique course in the longitudinal direction 24. Thus, the first projection 23 together with the outermost second end part 22 of the spectacle rod will form a recess 26 that is open in the longitudinal direction.

The recess 26 has an opening 27, which has a smaller cross-section than the cross-section that will be provided at a central part 28 of the recess 26. At the opening 27 of the recess, the first protrusion 23 is provided with a hook-shaped protrusion 29. This hook-shaped protrusion 29 helps to create the smaller opening 27 and at the same time will contribute to a safe retention of elastically compliant material from the friction element when the friction element is mounted on the metal rod, as illustrated for example in FIG. 2 and FIG. 10.

Figure 8:
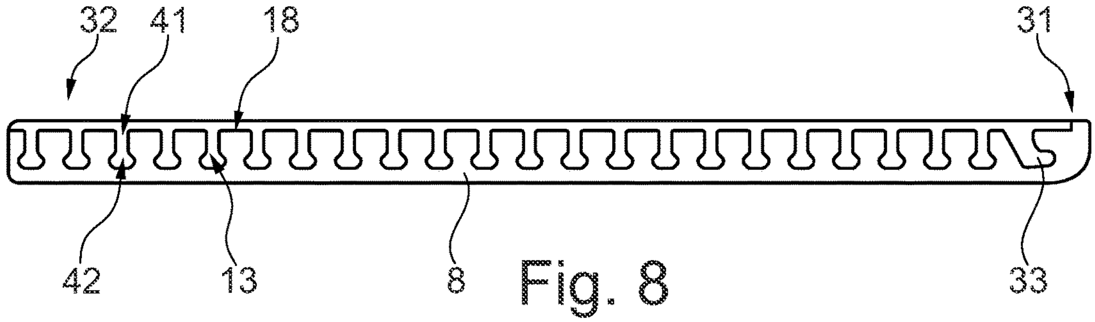
FIG. 8 shows a section through the friction element shown in FIG. 1.
Figure 9:
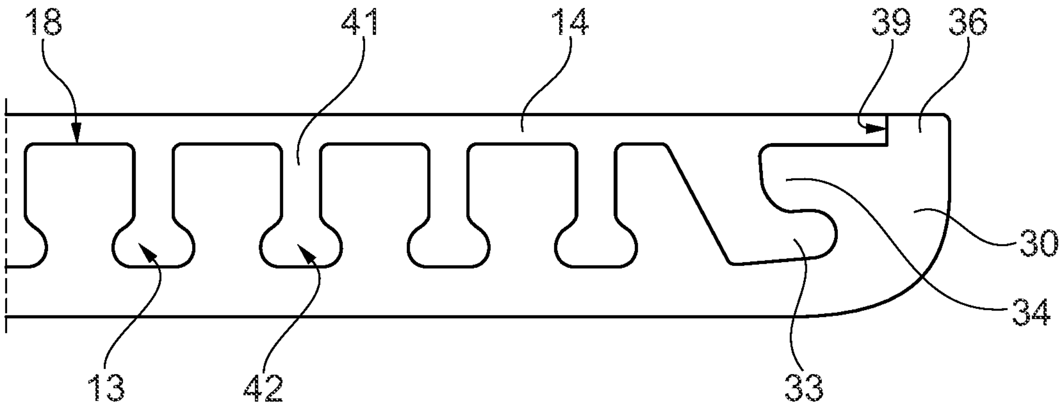
FIG. 9 shows a partial, enlarged image through the sectional view of FIG. 8.

FIGS. 8 and 9 show sectional views through the friction element 8. As is particularly clear from FIG. 9, the friction element conduit 14 is closed by a material quantity 30 at the first end 31 of the friction element. At the second end 32 of the friction element, the conduit 14 is open.

As is particularly clear from FIG. 9, at its first end part 31 the friction element is provided with a first transverse hole 33 in the material quantity 30 which closes the conduit 14. This hole 33 serves to receive the transverse first protrusion 23 of the metal rod.

Figure 10:
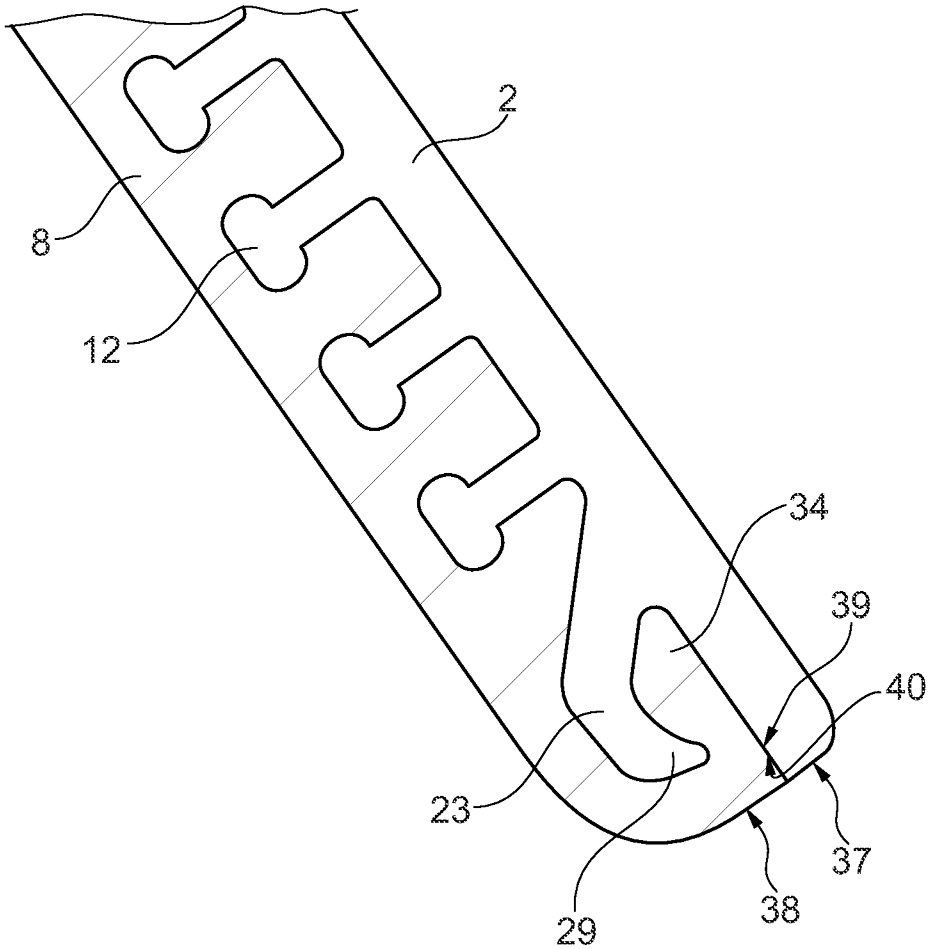
FIG. 10 shows an enlarged, partial view of the metal rod and friction element with the friction element shown in section.

As can be seen from FIG. 10, the material quantity 34 which delimits the transverse first hole 33 will be deformed when mounted on the metal rod 2. This ensures a retaining grip between the friction element 8 and the metal rod 2, so that the friction element cannot be inadvertently displaced in the longitudinal direction or the transverse direction. The engagement between the first protrusion 23 and the first transverse hole 33 as well as the material quantity 34 can be said to constitute the first retaining means.

The second protrusions 12 and the second holes 13 can be said to constitute second retaining means between the friction element 8 and the metal rod 2.

FIG. 7 shows that the metal rod 2 at its outermost second end 22 is provided with a groove 35. This groove 35 serves to receive a protruding material part 36 at the first end 31 of the friction element 8.

As can be seen from FIG. 10, it is hereby ensured that the outer end face 37 of the metal rod 2 lies level with the outer end face 38 of the friction element 8, the friction element face 39 being in abutment with the face 40 of the metal rod 2 in the groove 35.

In FIG. 8, the second holes 30 of the friction element 8 are shown with an opening 41 that has a smaller cross-section than that of the holes at a central part 42 of the second holes 13. This achieves a secure retention of the transverse second protrusions 12. As is particularly clear from FIG. 10, after the introduction of the transverse second protrusions 12, an elastic deformation of the friction element material will be provided, which contributes to the safe retention, as the second protrusions 12 are received in the second holes 13 with a clamping effect.

Similarly, the first protrusion 23 of the spectacle rod will have a size larger than the transverse first hole 33 of the friction element, so that, here too, receiving takes place with a clamping effect.

FIG. 6 shows that the metal rod 2 in an intermediate part 43 has an abutment face 44 at the end of the recess 11. This abutment face 44 serves for abutment with an end face 45 (see FIG. 8) of the friction element 8 when this is mounted on the metal rod 2. This establishes further safety against an accidental displacement of the friction element 8 relative to the metal rod 2.

Although the present invention has been disclosed in the form of embodiments and variations thereon, it will be understood that numerous additional modifications and variations could be made thereto without departing from the scope of the invention.

For the sake of clarity, it is to be understood that the use of “a” or “an” throughout this application does not exclude a plurality, and “comprising” does not exclude other steps or elements. The mention of a “unit” or a “module” does not preclude the use of more than one unit or module.

The invention claimed is:

1. A spectacle rod comprising:

a first end part configured for connection with a front piece, and a second end part configured to be bent to form an ear bend, wherein the spectacle rod has a longitudinal direction and a transverse direction, wherein the spectacle rod is formed, at least above the second end part of the spectacle rod, by a plate-shaped rod having side faces as well as bottom and top faces, wherein a friction element made from an elastic, compliant material is connected to the plate-shaped rod in a position at the ear bend for contact behind an ear of a user, wherein the plate-shaped rod has a first transverse protrusion directed in the transverse direction and in the longitudinal direction to form, together with the second end part of the spectacle rod, a longitudinally open recess, wherein, in a first end part of the friction element, a first transverse hole is provided for receiving the first transverse protrusion of the plate-shaped rod, wherein the plate-shaped rod is a metal rod, wherein the friction element forms a conduit so that conduit walls and a conduit bottom cover the side faces and the bottom face of the metal rod, wherein the first transverse hole of the friction element is formed to receive the first transverse protrusion of the metal rod, wherein elastic material at the first end part of the friction element is received in the longitudinally open recess of the metal rod, so that the first transverse protrusion and the longitudinally open recess form first retaining means, wherein between the conduit walls and bottom and the side faces of the metal rod, further retaining means are provided which prevent displacement of the friction element in the longitudinal direction and transverse direction of the metal rod, wherein the first transverse protrusion of the plate-shaped rod is provided at a outermost second end part of the metal rod, wherein the longitudinally open recess is formed together with the outermost second end part of the metal rod, which longitudinally open recess has at an opening a smaller cross-section than at a central part of the longitudinally open recess, wherein the friction element at a first end of the conduit is closed by a material quantity at the first end part of the friction element, wherein the first transverse hole of the friction element is also directed in the longitudinal direction, and wherein elastic material at the first end part of the friction element is received in the longitudinally open recess of the metal rod in an elastically compressed state.

2. The spectacle rod according to claim 1, wherein the metal rod at its bottom face is provided with a plurality of transverse second protrusions for releasable snap engagement with a plurality of second holes in the conduit bottom, and wherein the plurality of second protrusions at their connection to the metal rod have a smaller cross-section than that of the plurality of second protrusions at a distance from the metal rod, so that the plurality of second protrusions are retained in the plurality of second holes at the bottom of the conduit due to elastic compliance of the friction element.

3. The spectacle rod according to claim 1, wherein a transverse protrusion is formed at the opening of the recess on the first transverse protrusion and/or on the outermost second end part of the metal rod.

4. The spectacle rod according to claim 1, wherein the first transverse hole in the friction element is made with a size smaller than that of the first transverse protrusion of the metal rod, so that the first transverse protrusion of the metal rod is received therein.

5. The spectacle rod according to claim 1, wherein the conduit is formed with a smaller width than a thickness of the metal rod, so that the conduit walls are in elastic abutment with the side faces of the metal rod.

6. The spectacle rod according to claim 2, wherein the metal rod in an intermediate part, at a side facing the plurality of second protrusions of the metal rod, has an abutment face for an end face of the friction element.

7. The spectacle rod according to claim 1, wherein the friction element covers at least part of an outermost end face of the second end part of the metal rod.

8. The spectacle rod according to claim 1, wherein the metal rod is made from titanium.

9. The spectacle rod according to claim 1, wherein the conduit walls have decreasing thickness towards the side faces of the metal rod.

10. The spectacle rod according to claim 1, wherein the metal rod at the outermost second end part of the metal rod has a groove, where an end part of the friction element is in abutment.

11. The spectacle rod according to claim 1, wherein the first transverse protrusion is a hook.

* * * * *